US005822046A

United States Patent [19]

Kohda et al.

[11] Patent Number: 5,822,046

[45] Date of Patent: Oct. 13, 1998

[54] IMAGE RECORDING DEVICE

[75] Inventors: Hiroyuki Kohda; Kohji Uchida; Atsuhiro Doi, all of Kanagawa, Japan

[73] Assignee: Fuji Photo Film Co., Ltd., Kanagawa, Japan

[21] Appl. No.: 748,831

[22] Filed: Nov. 14, 1996

[30] Foreign Application Priority Data

Nov. 15, 1995 [JP] Japan .................................... 7-296720

[51] Int. Cl.[6] ............................ G03B 27/04; G03B 27/30

[52] U.S. Cl. ................................ 355/99; 355/97; 355/109

[58] Field of Search ................................ 355/97, 99, 100, 355/103, 108, 109, 111, 106, 78

[56] References Cited

U.S. PATENT DOCUMENTS 4,942,422 7/1990 Mashiko et al. .......................... 355/28

4,962,314 10/1990 Hirota et al. .............................. 355/99

*Primary Examiner*—R. L. Moses

*Assistant Examiner*—Shival Virmani

*Attorney, Agent, or Firm*—Sughrue, Mion, Zinn, Macpeak & Seas, PLLC

[57] ABSTRACT

An image recording device in which an image is exposed onto a photosensitive material, and an image forming solvent is applied thereto, and an image receiving material is superposed thereon, and then heat development transfer is carried out so as to obtain an image on the image receiving material, comprising: a fixed stage which holds the photosensitive material; an application unit which applies the image forming solvent to the photosensitive material; a superposing unit which superposes the image receiving material on the photosensitive material; a connecting tool which connects the application unit and the superposing unit such that the units are moved integrally with one of the units in front of the other; and a squeeze roller which is disposed between the application unit and the superposing unit and is moved in accordance with the integral movement thereof, wherein as the application unit and the superposing unit are moved such that the application unit is positioned in front of the superposing unit, the image forming solvent is applied to the photosensitive material by the application unit, the applied photosensitive material is squeezed by the squeeze roller, and the image receiving material is superposed by the superposing unit on the squeezed photosensitive material. Since the stage is used in common for application and superposition in this way, the image recording device can be made more compact.

21 Claims, 18 Drawing Sheets

IMAGE RECORDING DEVICE

BACKGROUND OF THE INVENTION

1. Field of the Invention

The present invention relates to an image recording device in which an image of a document is exposed onto a photosensitive material, and an image forming solvent is applied thereto, and an image receiving material is superposed on the photosensitive material, and then heat development transfer is carried out so as to obtain an image on the image receiving material.

2. Description of the Related Art

In an image recording device, a photosensitive material is exposed, an image forming solvent is applied to the exposed photosensitive material, an image receiving material is superposed on the applied photosensitive material, and heat development transfer is carried out so as to obtain an image on the image receiving material.

In this type of the conventional image forming device, exposure, solvent application and heat development transfer are respectively carried out on separate stages. Namely, a photosensitive material is exposed on an exposure stage, and then the photosensitive material is conveyed to an application stage such that a solvent is applied thereto. Thereafter, an image receiving material is superposed on the photosensitive material while the image receiving material is conveyed, and then heat development transfer is effected on a transfer stage.

In order to allow for a more compact device, a single stage may be used for respective processes, and in a state in which the photosensitive material is held on the stage, an application portion, a superposing portion and the like are driven to move so as to effect the respective processes.

However, it is not desirable if, due to the more compact device, a drive system for driving the above portions and a control system for controlling the drive system are complicated and the cost of the device increases.

SUMMARY OF THE INVENTION

With the aforementioned in view, an object of the present invention is to provide an image recording device in which a more compact device is allowed, in which a drive system and a control system for controlling the drive system are simplified, and in which the cost of the device decreases.

A first aspect of the present invention is an image recording device in which an image is exposed onto a photosensitive material, and an image forming solvent is applied to the photosensitive material, and an image receiving material is superposed on the photosensitive material, and then heat development transfer is carried out so as to obtain an image on the image receiving material, comprising: a fixed stage which holds the photosensitive material; an application unit which applies the image forming solvent to the photosensitive material held on the stage; a superposing unit which superposes the image receiving material on the photosensitive material held on the stage; connecting means which connects the application unit and the superposing unit such that the application unit and the superposing unit are moved integrally in a relationship in which one of the application unit and the superposing unit is positioned in front of the other of the application unit and the superposing unit; and a squeeze roller which is disposed between the application unit and the superposing unit, the squeeze roller being moved in accordance with the integral movement of the application unit and the superposing unit, wherein as the application unit and the superposing unit are moved such that the application unit is positioned in front of the superposing unit, the image forming solvent is applied to the photosensitive material by the application unit, the photosensitive material, to which the image forming solvent is applied, is squeezed by the squeeze roller, and the image receiving material is superposed by the superposing unit on the photosensitive material which has been squeezed.

In accordance with the above structure, the image is exposed onto the photosensitive material, the image forming solvent is applied to the exposed photosensitive material, the image receiving material is superposed on the applied photosensitive material, and the image is transferred to the image receiving material so as to obtain an image on the image receiving material.

When the image forming solvent is applied and the image receiving material is superposed on the photosensitive material, the stage is used in common. In a state in which the photosensitive material is held on the stage, the superposing unit and the application unit are mechanically integrated, i.e., the units are connected by the connecting means, so as to move on the stage. The application unit applies the image forming solvent to the photosensitive material, and then the photosensitive material is squeezed by the squeeze roller. Further, the image receiving material is superposed on the photosensitive material squeezed by the superposing unit.

Because the stage is used in common at the time of the application and superposition, the image recording device becomes more compact on the whole. Namely, it is not necessary to employ conveying means, e.g., a roller or the like, which convey the photosensitive material between the plurality of stages and which have been required for a conventional image recording device. Therefore, fewer parts can be used and manufacturing costs decrease. Further, the conveying distance of the photosensitive material is shortened, and the processing speed goes up.

The superposing unit and the application unit are mechanically integrated and moved on the stage such that application, squeeze and superposition are effected. Therefore, a drive system for moving the superposing unit and the application unit and a control system for controlling the drive system are used in common, the drive system and the control system are simplified on the whole, and the cost thereof is reduced.

In order to mechanically integrate the superposing unit with the application unit, connecting means may be used between the superposing unit and the application unit so as to change the interval (distance) therebetween, and the squeeze roller may be provided at the superposing unit.

Here, swelling time (the time which is required from effecting application to effecting squeeze) which is required for swelling the photosensitive material with the image forming solvent applied thereto is different in accordance with the characteristics, properties or the like of the photosensitive material.

In the conventional image recording device, the application portion, the squeeze roller and the superposing portion are fixed to the respective positions. As the photosensitive material is conveyed and changes a position thereof, application, squeeze and superposition are successively carried out. In this case, in order to change the swelling time, it is necessary to change the conveying speed (line speed) of the photosensitive material.

In the first aspect of the present invention in which the superposing unit and the application unit are mechanically integrated, the connecting means is used between the superposing unit and the application unit so as to change the interval therebetween and the squeeze roller is provided at the superposing unit. In this case, the interval between the squeeze roller and the application unit is changed by changing the interval between the superposing unit and the application unit. Accordingly, the time from which the application unit effects application to which the squeeze roller effects squeeze is adjusted so as to flexibly correspond to the photosensitive materials having respectively different swelling times.

It is possible that the stage, on which the photosensitive material is held at the time of application and superposition, is used in common for exposure and heat development transfer. As a result, the image recording device is made more compact. Moreover, if heating of the image forming solvent which is applied to the photosensitive material and heating required for the heat development transfer are obtained in common by, for example, heating the stage, electricity is saved. Accordingly, an even more compact image recording device can be obtained.

The exposure is applicable to a case in which a document is linearly illuminated by a light so as to be scan-exposed onto the photosensitive material or to a case in which a whole surface of the document is illuminated by the light so as to be planar-exposed onto the photosensitive material. Further, the light which exposes the photosensitive material may be a transmitted light which has been transmitted through the document, or may be a reflected light which has been reflected by the document. Namely, the document may be a reflecting document or may be a transmitting document. In this way, in a case in which the document is a reflecting document or a transmitting document, a so-called analog exposure is effected. However, the present invention is not limited to this, and a so-called digital exposure, in which the photosensitive material is scan-exposed by a light beam on the basis of an image signal, may be effected.

A second aspect of the present invention is an image recording device in which an image is exposed onto a photosensitive material, and an image forming solvent is applied to the photosensitive material, and an image receiving material is superposed on the photosensitive material, and then heat development transfer is carried out so as to obtain an image on the image receiving material, comprising: a fixed stage which holds the photosensitive material; and a superposing unit which superposes the image receiving material on the photosensitive material held on the stage, wherein the superposing unit is moved in a direction along the photosensitive material, in accordance with this movement, the image receiving material is sent in the direction, and the image receiving material is superposed on the photosensitive material from the front end of the image receiving material with the image receiving material being inverted.

In accordance with the above-described second aspect, as the superposing unit is moved along the photosensitive material, the image receiving material is sent in the direction, i.e., the same direction as the moving direction of the superposing unit, and is superposed on the photosensitive material with the front end of the image receiving material being inverted.

In the conventional technique, the photosensitive material is conveyed and inverted so as to be superposed with the image receiving material.

In the second aspect, since the image receiving material is superposed on the photosensitive material from the front end of the image receiving material with the image receiving material being inverted, the space, in which the image recording is sent for superposing the image receiving material on the photosensitive material, can be made small. Therefore, the image recording device on the whole can be made more compact. Moreover, because the contact angle between the photosensitive material and the image receiving material can be made larger, and the image receiving material is superposed on the photosensitive material without containing air therebetween, streaks on the image receiving material are prevented from occurring due to small or fine air bubbles.

Further, because the image receiving material is superposed on the photosensitive material with the image receiving material being inverted, the superposing unit includes rollers (the front roller serves as a pasting roller) at the front and back sides of the superposing unit along the moving direction thereof. The endless belt is entrained around these rollers. As the superposing unit moves, the endless belt travels. As the image receiving material is sent by traveling the endless belt, the image receiving material is superposed on the photosensitive material between the endless belt and the fixed stage with the portion of the image receiving material which corresponds to the pasting roller being inverted. Since the endless belt is used in this way, the number of rollers to be used can be decreased. Further, because the superposing unit includes the squeeze roller at the front side of the superposing unit in the moving direction thereof, as the superposing unit moves, the squeeze roller can exclusively squeeze the photosensitive material to which the image forming solvent is applied and on which the superposition has not yet been effected. In this case, the pasting roller and the squeeze roller can be closely provided at the superposing unit. As a result, the time from which the photosensitive material is squeezed to which the image receiving material is superposed on the photosensitive material is reduced, and the amount of evaporation of the image forming solvent can be decreased.

DESCRIPTION OF THE PREFERRED EMBODIMENTS

An image recording device relating to a first embodiment of the present invention will be described hereinafter on the basis of FIGS. 1 through 12.

Figure 1:
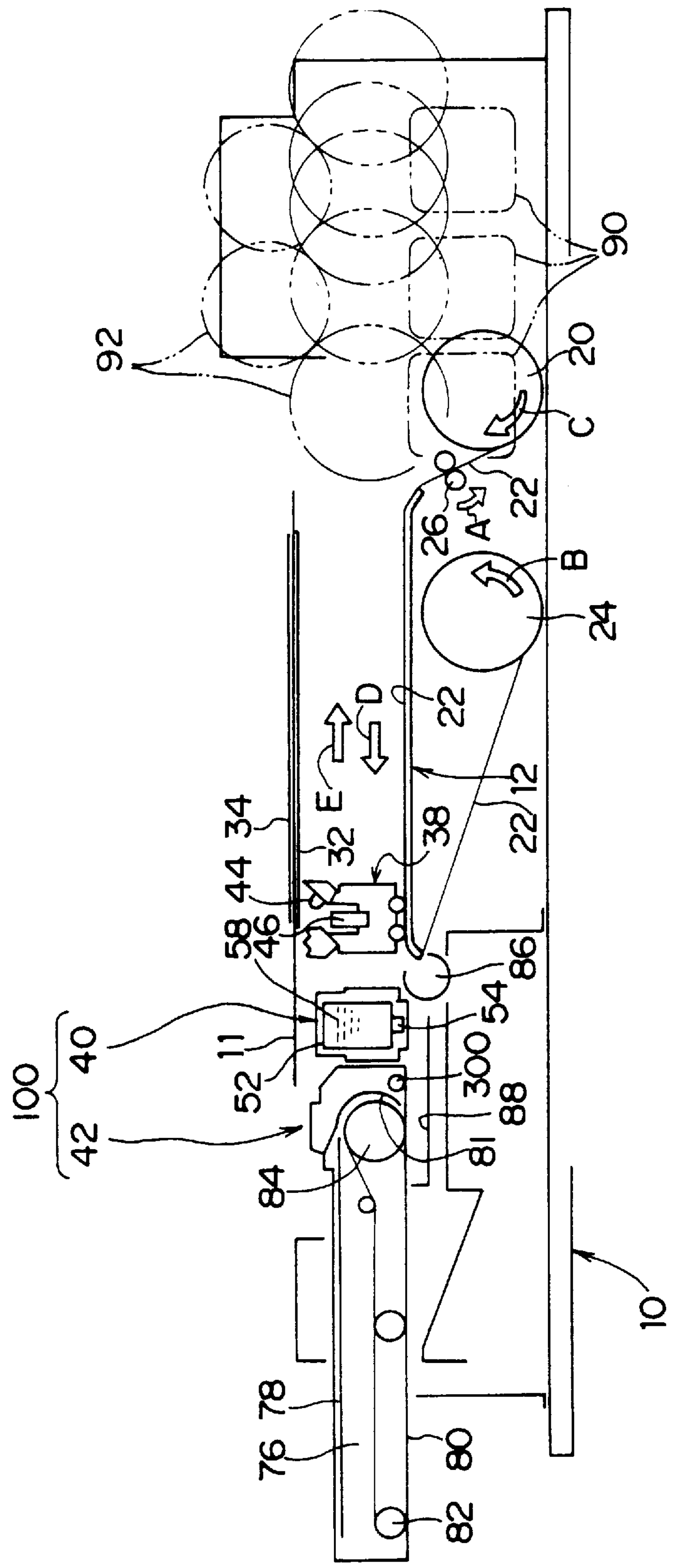
FIG. 1 is a view illustrating an image recording device relating to a first embodiment of the present invention, as seen along moving directions of units such as an exposure unit.
Figure 2:
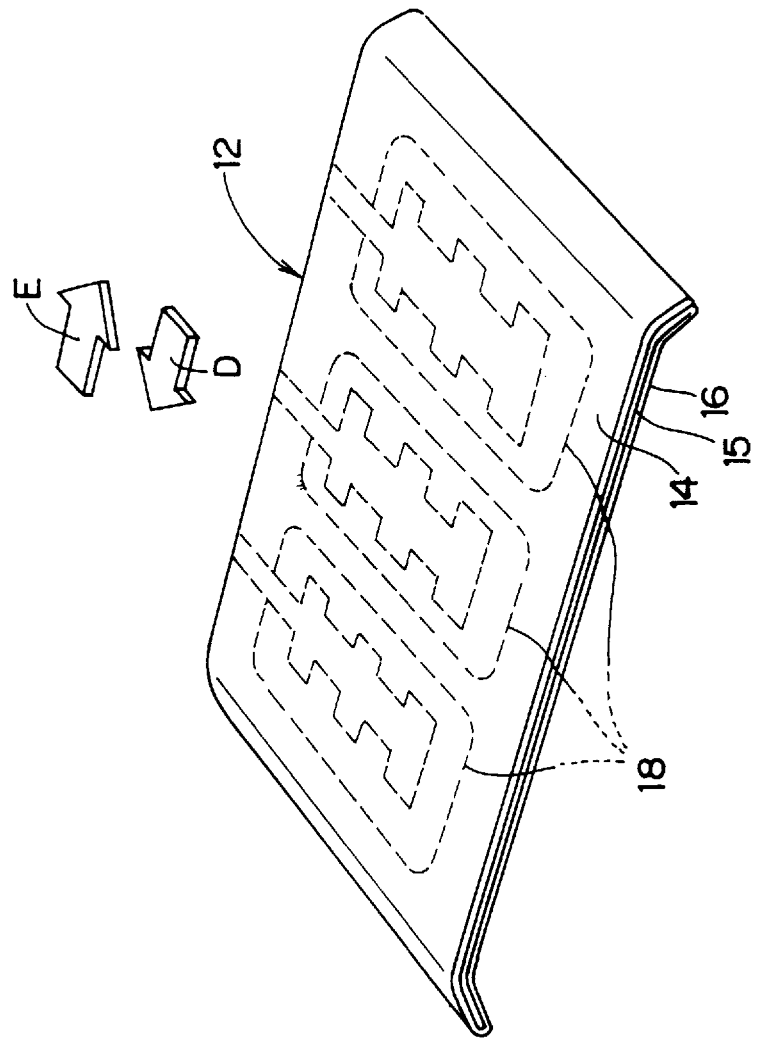
FIG. 2 is a perspective view of a stage at which exposure and the like are carried out.

As illustrated in FIG. 1, a stage 12 is provided at a central portion of an interior of a base stand 10. The stage 12 is shaped as a flat plate and is disposed horizontally. More specifically, as shown in FIG. 2, the stage 12 is formed of three layers and is structured such that a heat plate 15 is interposed between an aluminum plate 14, which forms a top surface of the stage 12, and a stainless plate 16, which forms a bottom surface thereof. The heat plate 15 includes, for example, three heat portions (heating means) 18 which are disposed in a row. By applying electricity to the heat portions 18, the temperature of the entire top surface of the stage 12 can be heated to and maintained at, for example, 80° C. The size of the stage 12 can be set arbitrarily, and can be, for example, a size corresponding to A6 size.

A first roller 20 is provided below the front end side of the stage 12 (the right end side in FIG. 1). A heat development photosensitive material 22 (hereinafter, "photosensitive material 22") which serves as a photosensitive material is taken up onto the first roller 20 so as to be accommodated in a roll-form. The photosensitive material 22 is formed by having, on a substrate, a photosensitive silver halide, a binder, a dye providing substance and a reducing agent. As will be described later, in a state in which the photosensitive material 22 is pulled out from the first roller 20 and held horizontally on the stage 12, the photosensitive surface thereof faces upward.

A second roller 24 is provided beneath the stage 12 in a vicinity or the above-described first roller 20. The photosensitive material 22, which has been pulled out from the first roller 20 and extends across the stage 12 from the front end to the rear end (the left end in FIG. 1) thereof, is taken up onto the second roller 24. Nip rollers 26 are disposed between the front end of the stage 12 and the first roller 20. If the nip rollers 26 are driven to rotate in the direction of arrow A and the second roller 24 is driven to rotate in the direction of arrow B, as the first roller 20 rotates in the direction of arrow C, the photosensitive material 22 is pulled out from the first roller 20, moves on the stage 12 in the direction of arrow D (from the front end toward the rear end of the stage 12), and is pulled and taken up by the second roller 24. Conversely, if the first roller 20 is driven to rotate in the direction opposite the direction of arrow C and the nip rollers 26 are driven to rotate in the direction opposite the direction of arrow A, the photosensitive material 22 moves on the stage 12 in the direction of arrow E, which is the direction opposite the direction of arrow D, and as the second roller 24 rotates in the direction opposite the direction of arrow B, the photosensitive material 22 from the second roller 24 is rewound around the first roller 20.

In this way, the photosensitive material 22 can be pulled out from the first roller 20 and taken up onto the second roller 24 such that a predetermined length thereof is supplied onto the stage 12. Conversely, the predetermined length of the photosensitive material 22 can be rewound around the first roller 20.

Figure 3:
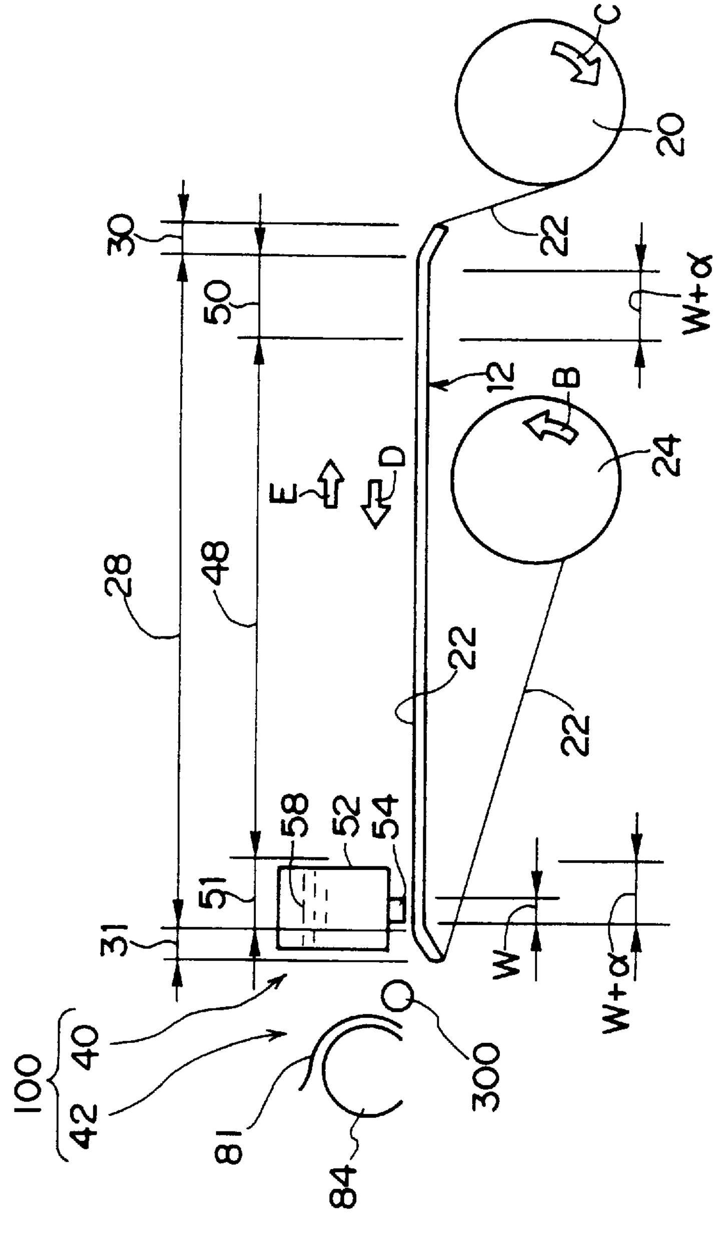
FIG. 3 is a view of the stage, as seen along front-and-back directions thereof.
Figure 4:
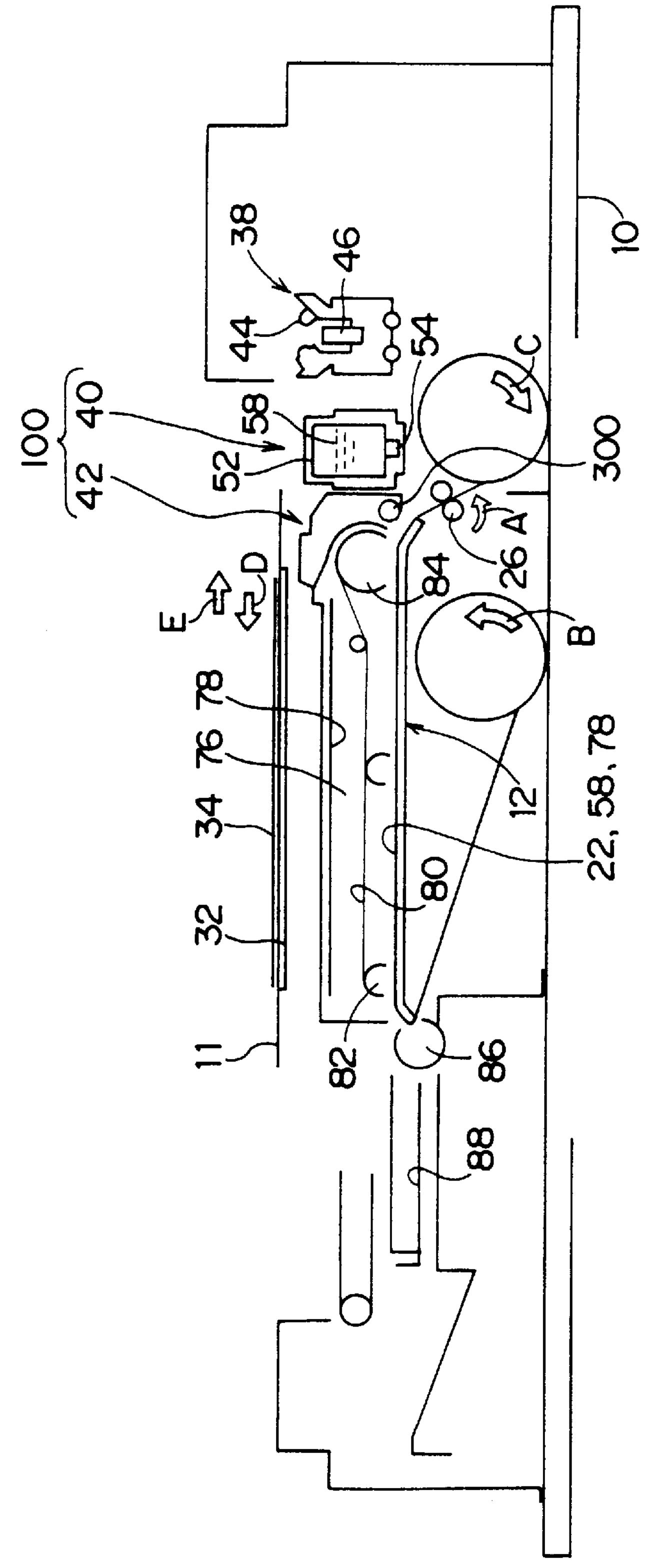
FIG. 4 is a view corresponding to FIG. 1 and illustrating a state in which the units such as the exposure unit are at stop positions.

As shown in FIG. 3, the stage 12 includes a planar portion 28, in which a top surface thereof is a horizontal plane, and inclined portions 30, 31, in which a top surface thereof inclines downwardly at the front and rear end portions of the stage 12. During exposure and the like which will be described later, a predetermined length of the photosensitive material 22 is positioned on the planar portion 28 and the photosensitive material 22 is pulled along the inclined portions 30, 31 so that the planarity of the predetermined length along the top surface of the planar portion 28 is maintained and the predetermined length of the photosensitive material 22 does not become slack. In this way, the photosensitive material 22 is held on the stage 12.

Above the stage 12, a document stand 32 is fit on a base stand top surface 11 so as to oppose the stage 12. The document stand 32 is formed by a transparent plate, and a document 34 is disposed and held on the document stand 32.

Next, an exposure unit 38, an application unit 40 and a superposing unit 42 are respectively provided at the image recording device. The application unit 40 and the superposing unit 42 form an integrated unit 100 in which the units 40 and 42 are mechanically integrated by connecting means, which will be described later. The exposure unit 38 is separated from the integrated unit 100 so as to be freely movable reciprocally along the front-and-back directions of the stage 12 between the document stand 32 and the stage 12. The exposure unit 38 and the integrated unit 100 can advance (the advancing direction is the direction of arrow E) from standby positions (the positions shown in FIG. 1) at which the exposure unit 38, the application unit 40 and the superposing unit 42 are disposed in this order so as to extend from the rear end of the stage 12 to a region off of the stage 12 to stop positions (the positions shown in FIG. 4) at which the units 38, 40, 42 are disposed in this order so as to pass beyond the front end of the stage 12 and extend to the stage 12 from a region off of the stage 12. Conversely, the units 38, 40, 42 can withdraw (the withdrawing direction is the direction of arrow D) from the stop positions to the standby positions.

The exposure unit 38 is equipped with a light source 44 and a SELFOC lens (lens array) 46. An LED, a halogen lamp or the like can be used for the light source 44. The light from the light source 44 is illuminated onto the document 34. The illuminated light is linear along a direction parallel to the document 34 and orthogonal to the moving direction of the exposure unit 38 (the front-and-back directions of the stage 12), i.e., the illuminated light is linear along directions orthogonal to the page surface of FIG. 1. The illuminated light is reflected by the document 34, and the reflected light is exposed by the SELFOC lens 46 in a slit-like form onto the photosensitive material 22. As the exposure unit 38 advances from the standby position to the stop position, the image of the document 34 is successively scan-exposed onto the photosensitive material 22.

As illustrated in FIG. 3, an exposed area (image area) 48 is set in the center of the photosensitive material 22 such that an unexposed area (non-image area) is formed at the front and back portions of the photosensitive material 22 within the range of the predetermined length thereof. The non-image area at the rear end side of the stage 12 is a front area 51, and the non-image area at the front end side of the stage 12 is a rear area 50.

Figure 5:
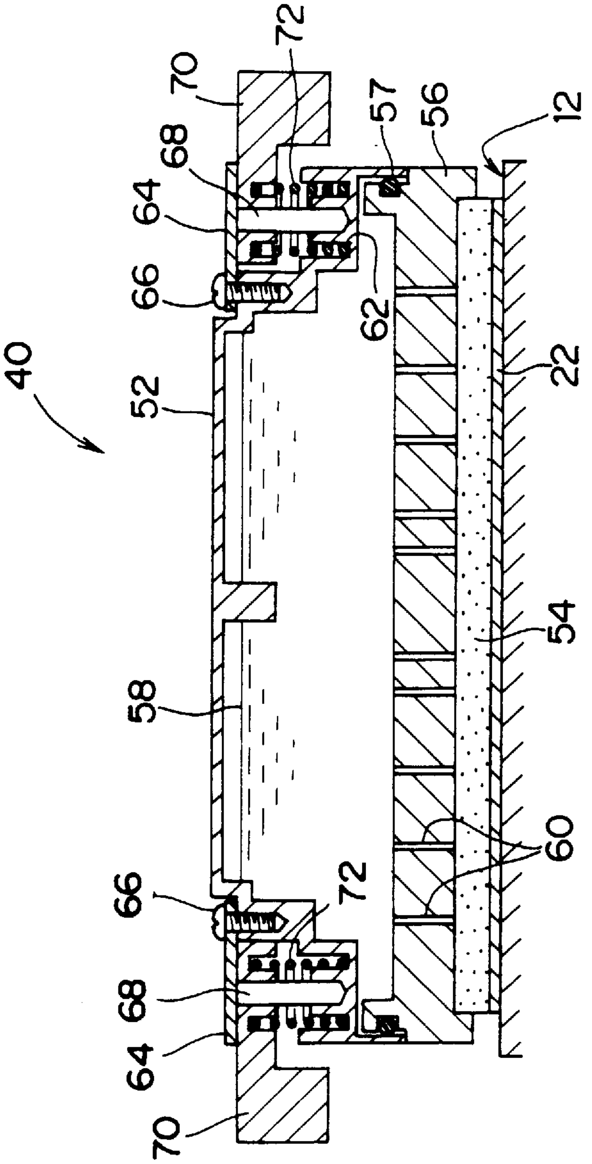
FIG. 5 is a longitudinal sectional view of an application unit, as seen from a moving direction thereof.

The application unit 40 of the integrated unit 100 is structured such that a sponge (application portion) 54 is provided at the bottom of a tank (container) 52. The tank 52 is shaped as a rectangular box which is parallel to the photosensitive material 22 and which is elongated in a direction orthogonal to the front-and-back directions of the stage 12. As illustrated in FIG. 5, the tank 52 is closed via an O-ring 57 by a cover 56 which forms the tank bottom, such that the interior of the tank 52 is sealed. A transfer assistant (image forming solvent) such as water 58 or the like is filled within the tank 52. The sponge 54 is fixed to the outer surface of the cover 56 (the cover bottom surface), and communicating ports 60 which communicate with the sponge 54 are formed at the cover 56. Water within the tank 52 is absorbed and held by the sponge 54 through the communicating ports 60. The upper portions of the longitudinal direction ends of the tank 52 are notched so as to form steps 62. A supporting piece 64 is fastened by a bolt 66 to the upper end of the tank 52 and is projected so as to oppose the step 62. An engagement shaft 68 extends in upward and downward directions between the supporting piece 64 and the step 62. One end portion of an operation block 70 is fit with the engagement shaft 68. A coil spring 72 is fit between the operation block 70 and the step 62, and urges the operation block 70 so as to abut the supporting piece 64. A plunger of an unillustrated solenoid is connected to the other end portion of the operation block 70 such that the sponge 54, together with the container 52, is raised and lowered by the solenoid. At the raised position of the operation block 70, the sponge 54 is separated from the photosensitive material 22. The amount by which the operation block 70 is lowered is greater than the interval between the sponge 54 and the photosensitive material 22 at the raised position of the operation block 70. At the lowered position of the operation block 70, the sponge 54 is pressed against the photosensitive material 22 by the urging force of the coil spring 72 so as to contact the photosensitive material 22. When the sponge 54 contacts the photosensitive material 22, the water which has been absorbed and held by the sponge 54 flows out to the photosensitive material 22.

As the integrated unit 100 advances in a state in which the sponge 54 contacts the photosensitive material 22, the water is applied to the photosensitive material 22 in the direction of arrow E in FIG. 1.

The superposing unit 42 of the integrated unit 100 is provided with a magazine 76. An image receiving material 78 is cut to predetermined lengths and stacked so as to be accommodated within the magazine 76 which is parallel to the stage 12. One of the surfaces of the image receiving material 78 is an image forming surface. A dye/fixing material having mordant is applied to the image forming surface. In a state in which the image receiving material 78 is accommodated, the image forming surface thereof faces upward. Beneath the magazine 76, an endless belt 80 is entrained around the rollers 82, 84. A guide portion 81 is provided at the outer periphery of the roller 84 which is at the stage 12 side when the integrated unit 100 is at the standby position.

Figure 6:
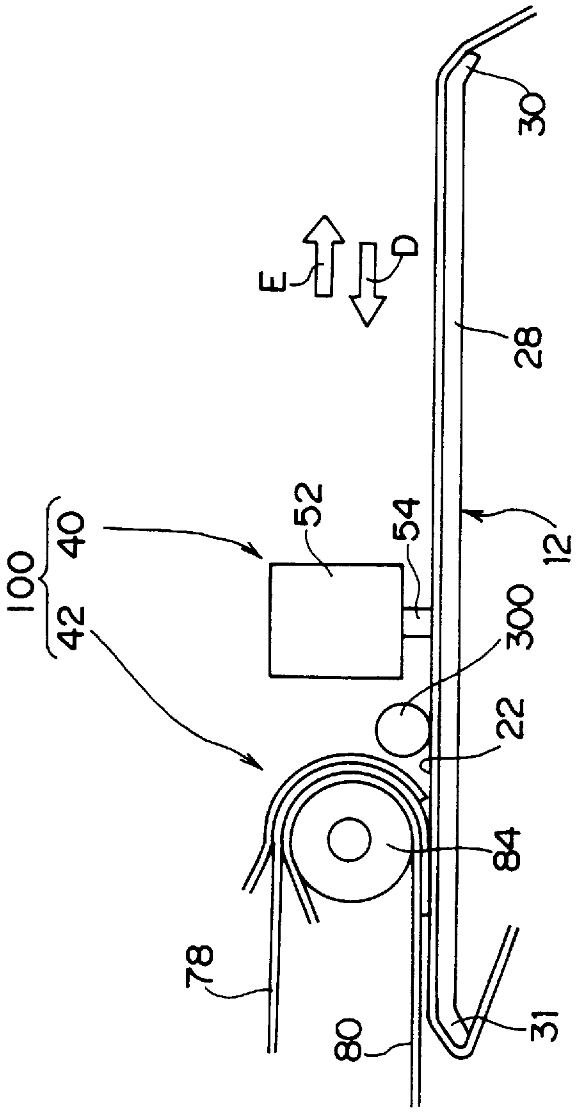
FIG. 6 is a view showing a process in which an image receiving material is superposed on a photosensitive material on the stage by a superposing unit.
Figure 7:
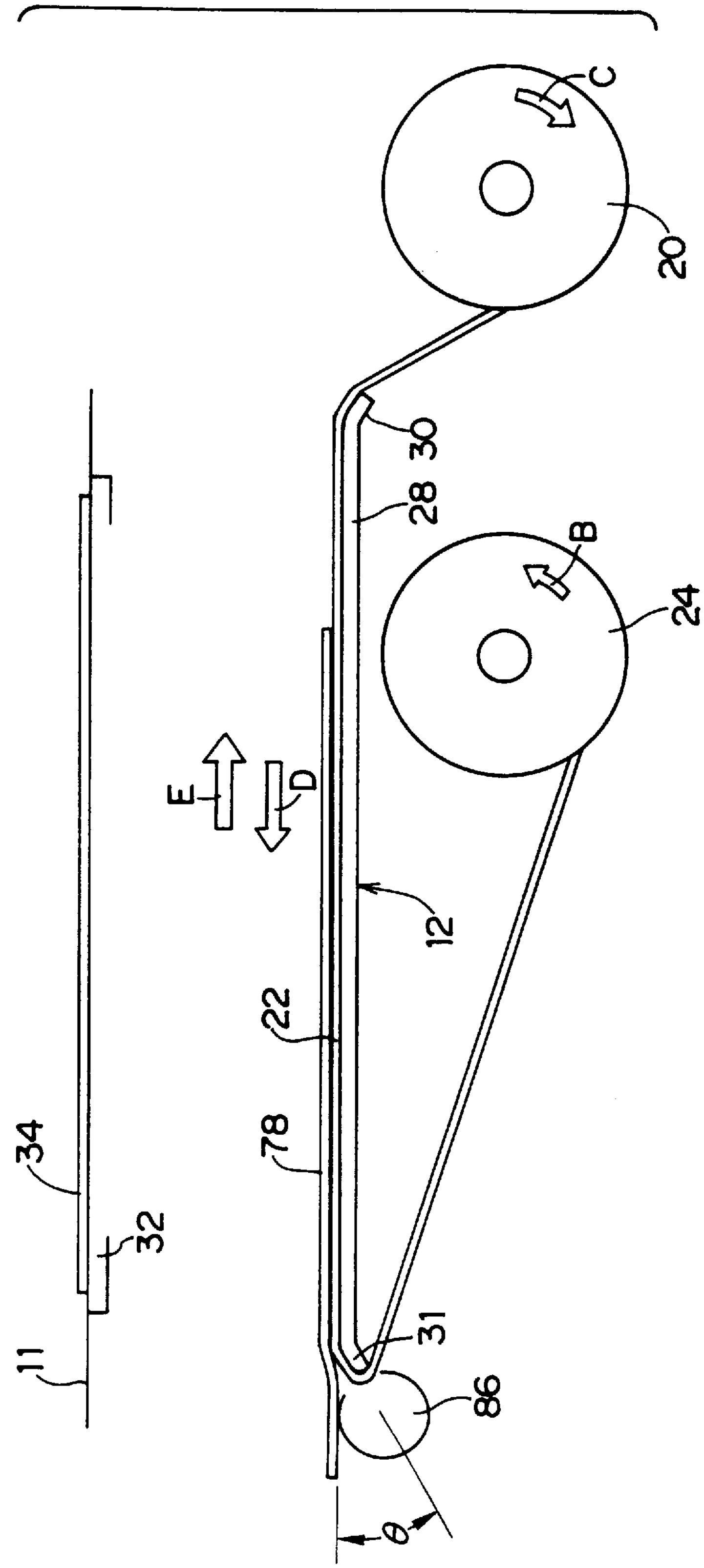
FIG. 7 is a view showing a peeling process of the photosensitive material and the image receiving material when they are discharged to a region off of the stage.

As the integrated unit 100 advances, the endless belt 80 reaches the region above the stage 12 and travels above the stage 12 clockwise in FIG. 1 so as to correspond to the advance of the integrated unit 100. As shown in FIG. 6, as the endless belt 80 travels, the image receiving material 78 within the magazine 76 is pulled out from the magazine 76 and inverted by the guide portion 81. The pulled-out end of the image receiving material 78 abuts the photosensitive material 22. Thereafter, as the integrated unit 100 moves, the image receiving material 78 is successively superposed on the photosensitive material 22 toward the front end of the stage 12 such that the image receiving material 78 is held between the endless belt 80 and the photosensitive material 22.

In order to mechanically integrate the superposing unit 42 and the application unit 40 to form the integrated unit 100, connecting means can be provided between the superposing unit 42 and the application unit 40 so as to change the interval therebetween along the moving directions of the integrated unit 100.

Figure 11:
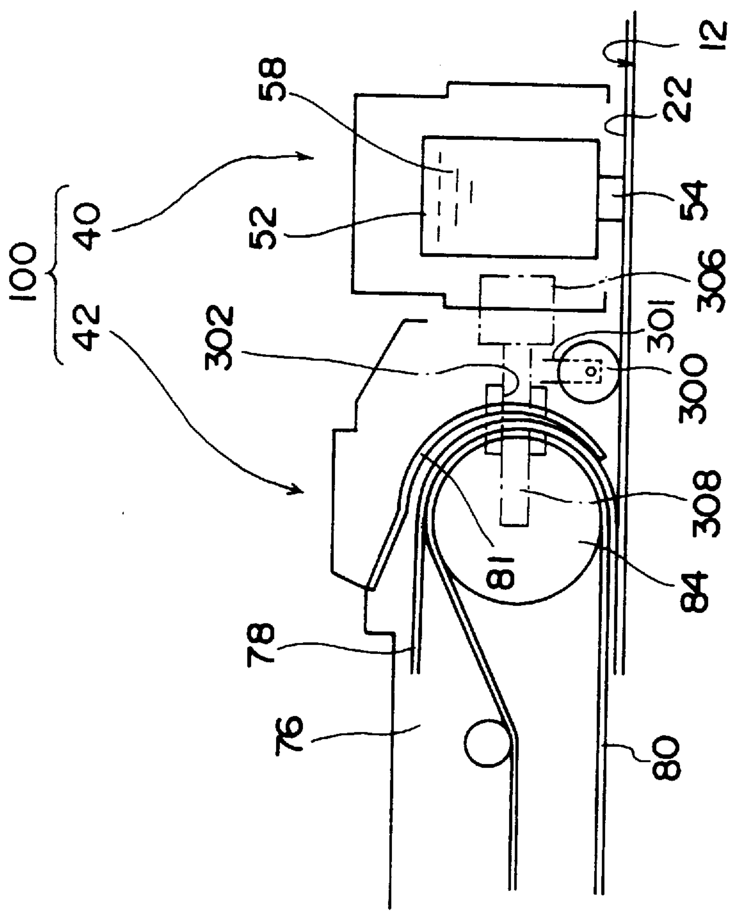
FIG. 11 is a view illustrating connecting means which relates to integration of the application unit and the superposing unit, as seen along a moving direction of an integrated unit.
Figure 12:
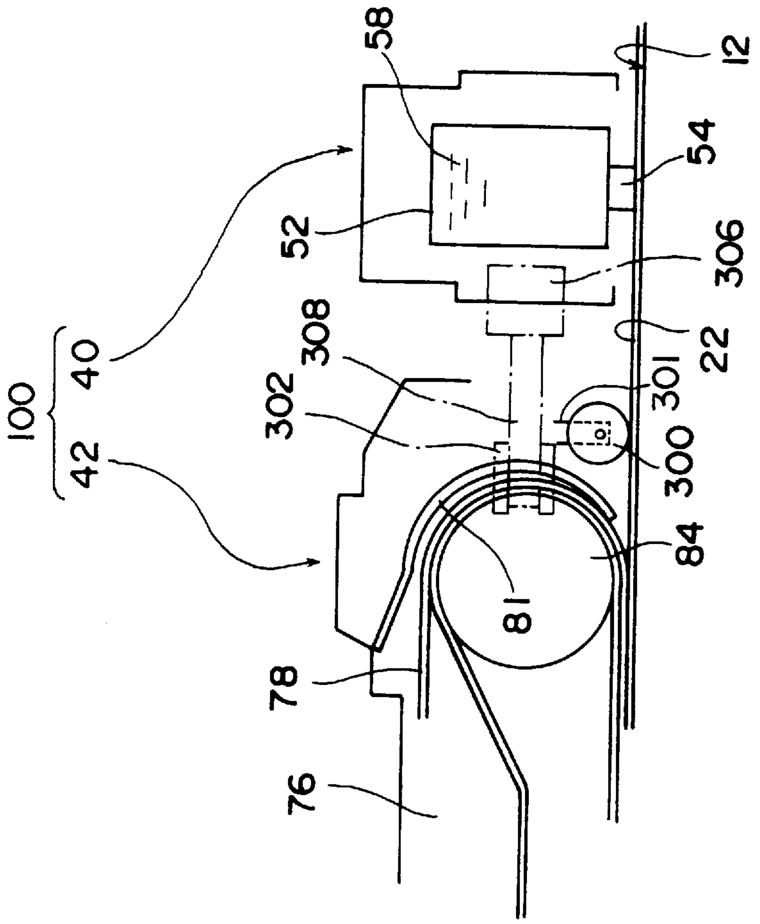
FIG. 12 is a view corresponding to FIG. 11 and showing a state in which an interval between the application unit and the superposing unit is increased.

As illustrated by chain lines in FIGS. 11 and 12, the connecting means include a female screw portion 302 which is provided at the superposing unit 42, an adjusting motor 306 which is provided at the application unit 40 so as to enable normal and reverse rotations of the motor 306, a male screw portion 308 which is provided at the application unit 40. The male screw portion 308 extends toward the superposing unit 42, in particular, toward the female screw portion 302, and is rotated by the adjusting motor 306 so as to be screwed to the female screw portion 302. Therefore, for example, when the motor 306 is subject to the normal rotation, the male screw portion 308 is screwed to the female screw portion 302 such that the superposing unit 42 and the application unit 40 are in a connected state. In the connected state, because the male screw portion 308 is screwed to the female screw portion 302, unless the motor 306 is rotated, the interval between the superposing unit 42 and the application unit 40 is unchanged. Conversely, for example, if the motor 306 is subject to the reverse rotation, the male screw portion 308 and the female screw portion 302 are unscrewed such that the connected state between the superposing unit 42 and the application unit 40 is released. Further, in the connected state, due to the appropriate normal or reverse rotations of the motor 306, the amount of which the male screw portion 308 is screwed to the female screw portion 302 is changed such that the superposing unit 42 and the application unit 40 are moved closer to or away from each other. FIG. 11 shows a state in which the interval between the superposing unit 42 and the application unit 40 is set small, and FIG. 12 shows a state in which the interval between the superposing unit 42 and the application unit 40 is set large. In the first embodiment, the female screw 302 is provided at the superposing unit 42, and the adjusting motor 306 and the male screw portion 308 are provided at the application unit 40. However, in the present invention, the adjusting motor 306 and the male screw portion 308 may be provided at the superposing unit 42, and the female screw portion 302 may be provided at the application unit 40. Moreover, the female screw portion 302, instead of the male screw portion 308, may be rotated by the adjusting motor 306.

The superposing unit 42 supports a squeeze roller 300 via a supporting member 301 so as to be able to rotate the squeeze roller 300. The squeeze roller 300 is positioned between the superposing unit 42 and the application unit 40. As the interval between the superposing unit 42 and the application unit 40 is changed via the connecting means, the interval between the squeeze roller 300 and the application unit 40 is changed.

The photosensitive material 22 is swelled with the water 58 which has been applied thereto. The time required for the swelling is secured by having the interval between the squeeze roller 300 and the application unit 40. After the swelling, the squeeze roller 300 rotates onto the photosensitive material 22 so as to squeeze the water 58 on the photosensitive material 22.

As described above, the stage 12 is heated by the heat portions 18. In the heated state, the aforementioned exposure, application and superposition are effected. At the time of application, water is heated. Namely, the water 58 is heated during the process in which the water 58 flows out from the sponge 54 to the photosensitive material 22 and also heated after the flowed-out water is applied to the photosensitive material 22.

Further, due to the heating of the stage 12, heat development transfer is effected in a state in which the image receiving material 78 is superposed on the photosensitive material 22. Namely, mobile dyes of the photosensitive material 22 are released, and simultaneously, the dyes are transferred to the dye-fixing layer of the image receiving material 78 so as to obtain an image on the image receiving material 78.

After the heat development transfer, a predetermined length of the photosensitive material 22 is moved in the direction of arrow D. The photosensitive material 22, together with the image receiving material 78, is discharged from the rear end of the stage 12 to a region off of the stage 12.

Moreover, driving motors 90 are provided at the base stand 10 in front of the front end of the stage 12. The driving motors 90 are driven to move the exposure unit 38 and the integrated unit 100 via a group of gears 92 and a timing belt (unillustrated).

Figure 8:
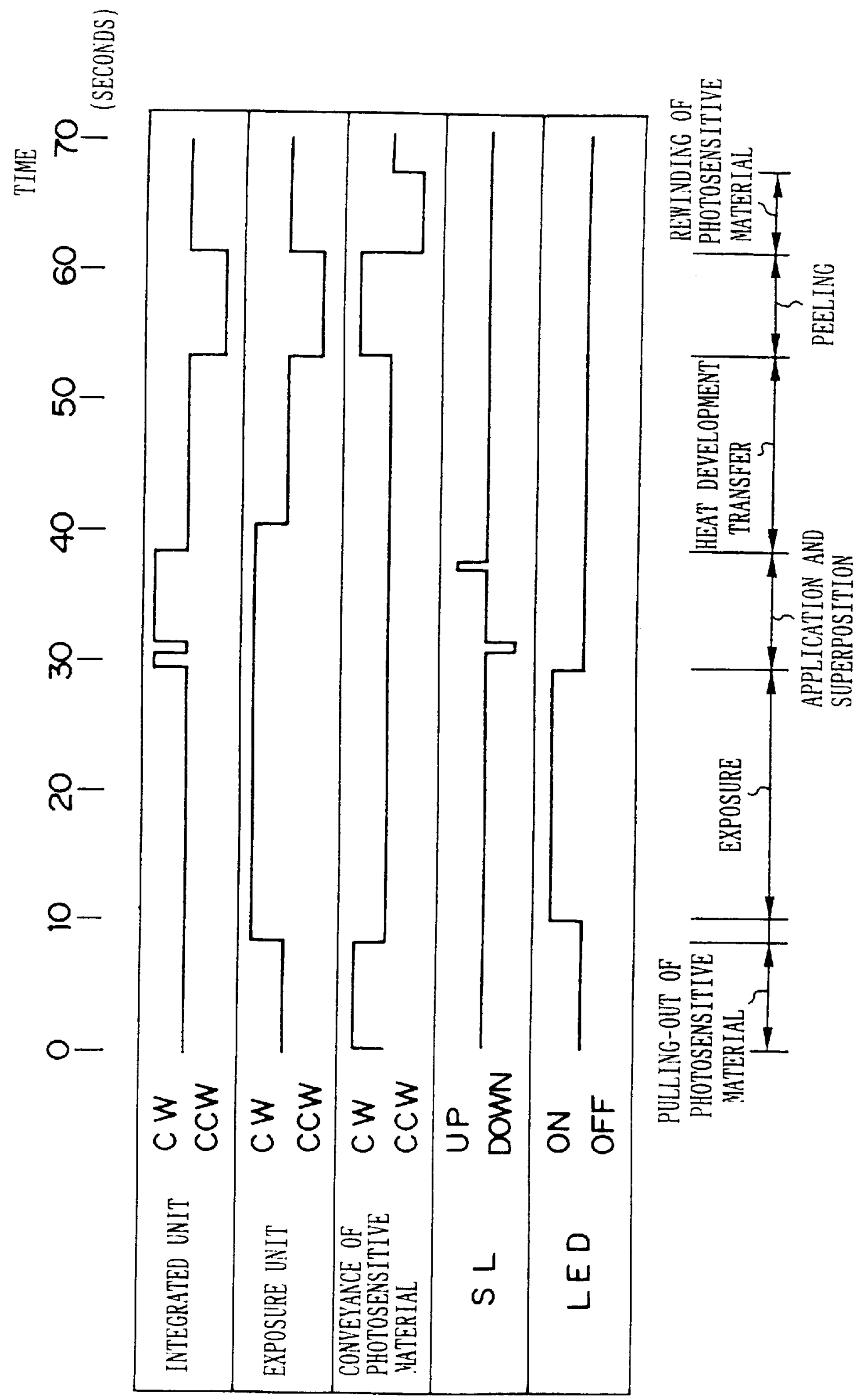
FIG. 8 illustrates a time chart of the units such as the exposure unit.
Figure 9:
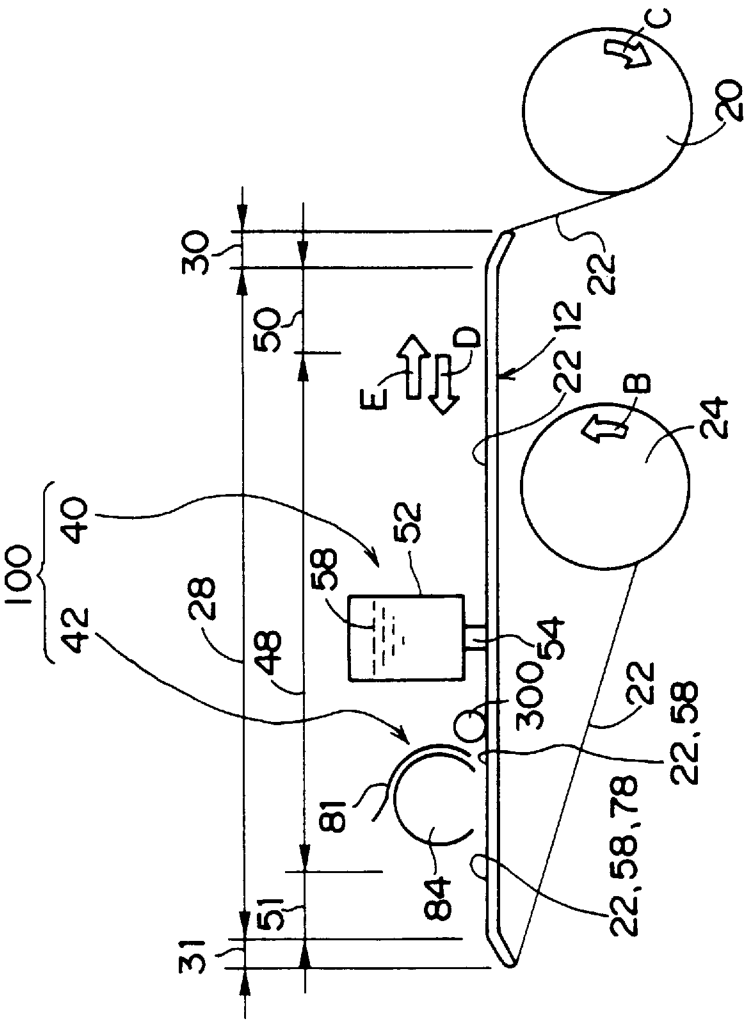
FIG. 9 is a view corresponding to FIG. 3 and illustrating an application process of the application unit after the state shown in FIG. 3.
Figure 10:
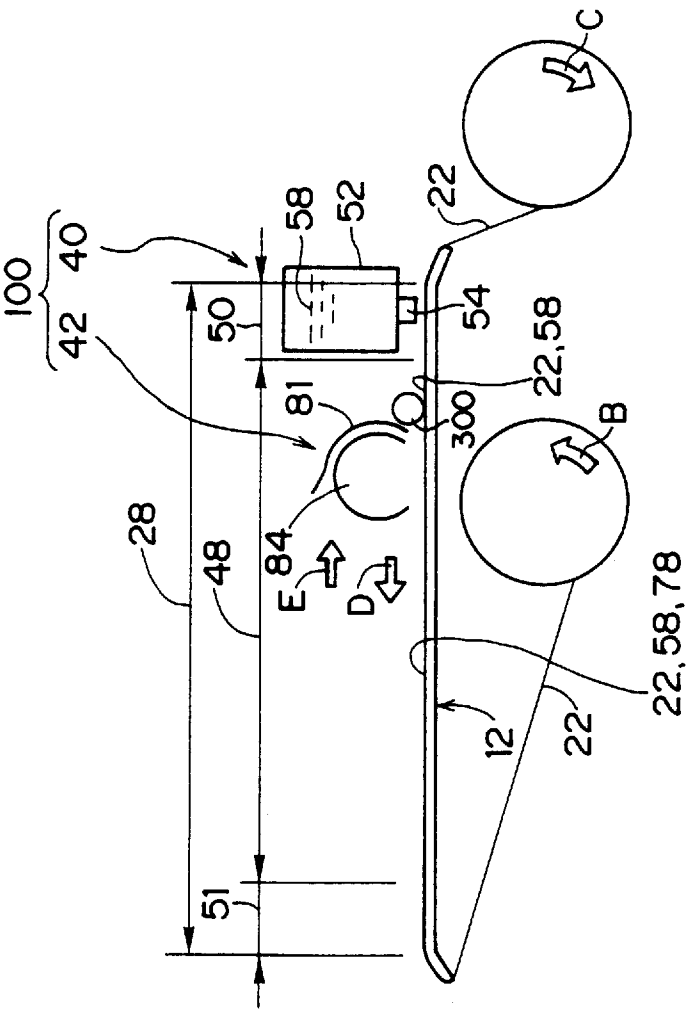
FIG. 10 is a view corresponding to FIG. 3 and illustrating an application process of the application unit after the state shown in FIG. 9.

Next, the overall operation of the device which includes the exposure unit 38, the integrated unit 100 and the like are concretely described on the basis of time chart shown in FIG. 8.

First, the photosensitive material 22 is conveyed (CW), and a predetermined length thereof is pulled out and held on the stage 12.

Next, when the exposure unit 38 advances (CW) from the standby position to the stop position and enters the image area 48 of the photosensitive material 22, the light source (LED) 44 starts illuminating the light (ON) and continues to illuminate the light above the image area 48 such that an image of the document 34 on the document stand 32 is scan-exposed onto the photosensitive material 22.

When the exposure unit 38 passes the image area 48 and enters the non-image area (the rear area) 50, the light source 44 stops illuminating the light (OFF). Thereafter, the light source 44 does not illuminate the light, and the exposure unit 38 advances and stops at the stop position.

When the exposure unit 38 passes the image area 48 and enters the non-image area (the rear area) 50, and the light source 44 stops illuminating the light, the integrated unit 100 begins to advance (CW).

Initially, the application unit 40 of the integrated unit 100 is at a raised position and separated from the photosensitive material 22. When the application unit 40 enters above the stage 12 and reaches the front area 51 of the horizontal (or planar) portion 28 from the inclined portion 31 at the rear end side of the stage 12 (illustrated in FIG. 3), the integrated unit 100 stops temporarily. In the stopped state, the solenoid (SL) operates (DOWN), and the sponge 54, together with the tank 52, is lowered so as to contact the photosensitive material 22.

After the sponge 54 contacts the photosensitive material 22, the integrated unit 100 starts to advance again. In the contact state, the integrated unit 100 enters the image area 48 from the front area 51 and moves above the image area 48 (illustrated in FIG. 9). When the sponge 54 reaches the rear area 50, the solenoid operates (UP), and the sponge 54, together with the tank 52, is raised such that the sponge 54 is separated from the photosensitive material 22 and contact of the sponge 54 and the photosensitive material 22 is stopped (illustrated in FIG. 10). While the contact is stopped, the integrated unit 100 continues to advance.

Since the start of contact and the end of the contact between the sponge 54 and the photosensitive material 22 do not take place on the image area 48, stable application is possible on the image area 48. In addition, since the sponge 54 contacts the photosensitive material 22 within the range of the horizontal (planar) portion 28 of the stage 12, the applied water 58 flows out to the front and back sides of the photosensitive material 22 such that harmful effects associated with such flow are avoided.

In the superposing unit 42 of the integrated unit 100, while the squeeze roller 300 squeezes the photosensitive material 22 from the rear side of the application unit 40, the image receiving material 78 is successively superposed on the photosensitive material 22.

When the superposing unit 42 completes the superposition, the integrated unit 100 moves and then stops at the stop position.

After the integrated unit 100 stops at the stop position, the integrated unit 100 remains thereat for a predetermined period of time such that heat development transfer is carried out.

After the heat development transfer, a predetermined length of the photosensitive material 22 is pulled out and conveyed (CW) by the second roller 24. The photosensitive material 22, together with the image receiving material 78, is discharged from the rear end of the stage 12 to a region off of the stage 12.

Due to the discharge, the image receiving material 78 is peeled from the photosensitive material 22, passes on a peeling roller 86 which is disposed behind the rear end of the stage 12, and is stacked in a discharge tray 88 which is disposed further behind the peeling roller 86. On the other hand, a portion of the photosensitive material 22 for which heat development transfer has been completed (hereinafter, "heat-development-transferred portion") is inclinedly positioned between the rear end of the stage 12 and the second roller 24 such that the heat-development-transferred portion is turned upside down.

The application surface of the heat-development-transferred portion, which is positioned between the second roller 24 and the rear end of the stage 12, faces downward. As a result, the water 58 can drop from the photosensitive material 22 without remaining thereon. As will be described later, when the photosensitive material 22 is rewound and the heat-development-transferred portion returns to the stage 12, harmful effects which are caused by the water remaining on the photosensitive material 22 are avoided.

Thereafter, the exposure unit 38 and the integrated unit 100 are withdrawn from the stop positions to the standby positions with the integrated unit 100 being withdrawn first (CCW). The exposure unit 38 and the integrated unit 100 prepare for the subsequent exposure, application and superposition.

Next, a predetermined length of the photosensitive material 22 is rewound around the first roller 20. As a result, the image area 48 which has been exposed and for which heat development transfer has been completed is positioned on the stage 12. It does not matter even if outside light from the document stand 32 reaches the image area 48. The unexposed portion of the photosensitive material 22 in the region off of the stage 12 is prevented from light fogging.

On the common stage 12, the photosensitive material 22 is exposed, water is applied to the photosensitive material 22, the image receiving material 78 is superposed on the photosensitive material 22 and heat development transfer is carried out onto the image receiving material 78 such that an image is obtained on the image receiving material 78.

In accordance with the above-described structure, the image is exposed onto the photosensitive material 22, the water 58 is applied to the exposed photosensitive material 22, and the image receiving material 78 is superposed on the applied photosensitive material 22 such that an image is obtained on the image receiving material 78.

In a state in which application and superposition are carried out on the common stage 12 and the photosensitive material 22 is held on the stage 22, the integrated unit 100, which is structured by mechanically integrating the superposing unit 42 and the application unit 40, moves above the stage 12. The application unit 40 effects application, and at the superposing unit 42 which is disposed at the rear side of the application unit 40, the squeeze roller 300 squeezes the photosensitive material 22 and the image receiving material 78 is superposed on the squeezed photosensitive material 22.

Since the stage 12 is used in common for application and superposition, the image recording device is made more compact on the whole. Namely, it is not necessary to employ conveying means between the stages, e.g., a roller or the like, so that fewer parts can be used and manufacturing costs decrease. Further, the conveying distance is shortened, and the processing speed goes up.

At the time of moving a superposing unit and an application unit which are desired for obtaining a more compact device, the integrated unit 100 which is structured by mechanically integrating the superposing unit 42 and the application unit 40 moves on the stage 12 so as to effect application, squeeze and superposition. Therefore, the drive system for moving the superposing unit 42 and the application unit 40 and the control system for controlling the drive system are used in common, and the drive system and the control system are simplified on the whole so as to reduce the cost thereof.

Here, the swelling time (the time which is required from effecting application to effecting squeeze) which is required for swelling the photosensitive material 22 with the water 58 applied thereto is different in accordance with the photosensitive material 22.

Conventionally, the application portion, the squeeze roller and the superposing portion are fixed to the respective positions. As the photosensitive material is conveyed and changes a position thereof, application, squeeze and superposition are successively carried out. In this case, in order to change the swelling time, it is necessary to change the conveying speed (line speed) of the photosensitive material.

As the connecting means 302, 308 whose interval can be changed are used between the superposing unit 42 and the application unit 40 and the superposing unit 42 includes the squeeze roller 300, the gap between the superposing unit 42 and the application unit 40 is changed such that the interval between the squeeze roller 300 and the application unit 40 is changed. Consequently, the time at which the application unit 42 effects application to the time at which the squeeze roller 300 effects squeeze is adjusted so as to be able to correspond flexibly to the photosensitive material 22 having different swelling time.

The following other means is possibly used as connecting means which changes the interval between the superposing unit 42 and the application unit 40.

Figure 13:
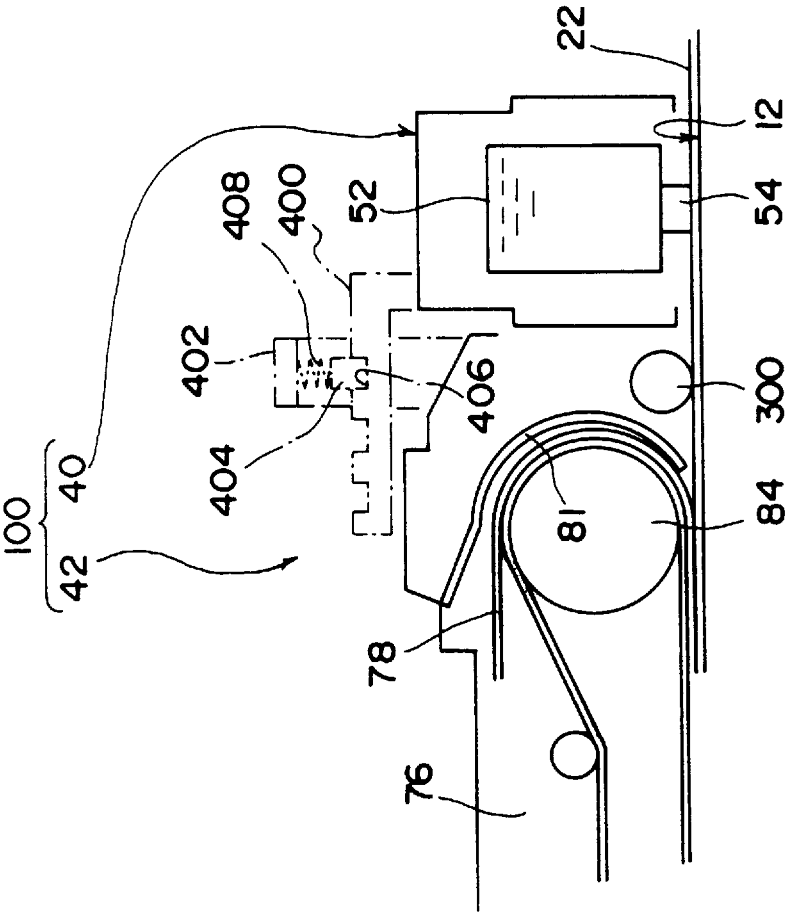
FIG. 13 is a view corresponding to FIG. 11 and showing another connecting means.
Figure 14:
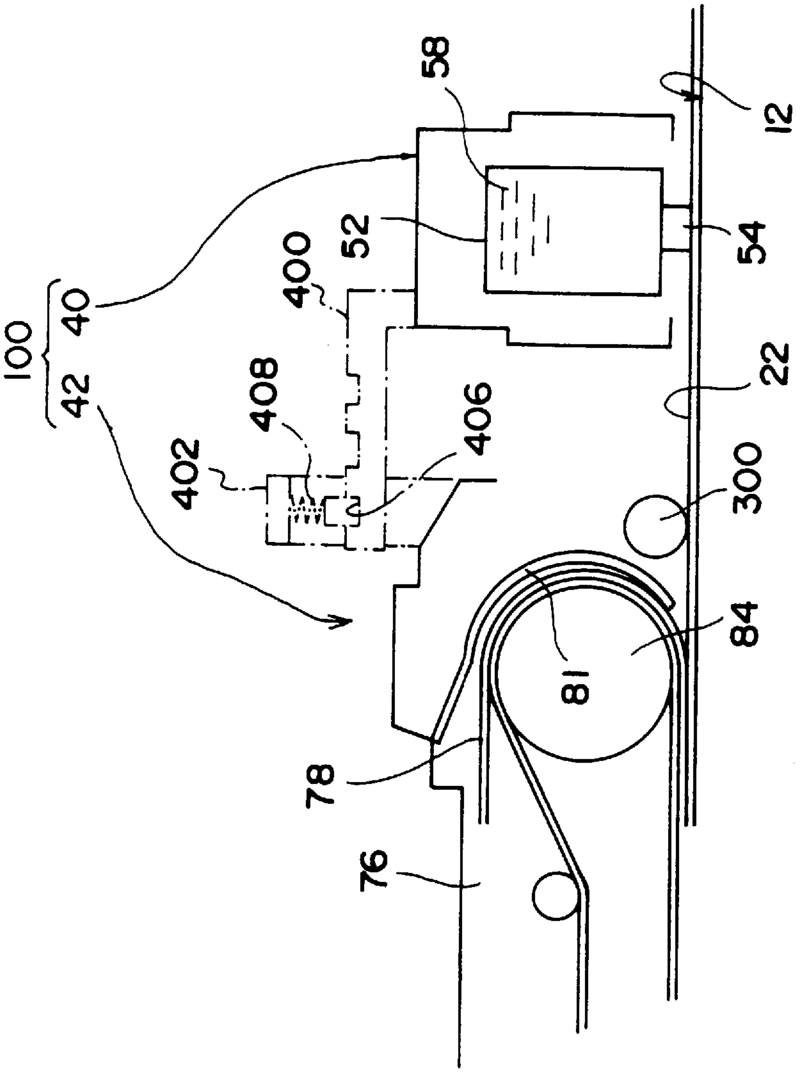
FIG. 14 is a view corresponding to FIG. 13 and showing a state in which an interval between the application unit and the superposing unit is increased.

As illustrated by chain lines in FIGS. 13 and 14, a connecting tool 400 is provided at the application unit 40 side. The connecting tool 400 is elongated and extended from the application unit 40 to the superposing unit 42. A corresponding connecting tool 402 is provided at the superposing unit 42 side so as to correspond to the connecting tool 400. An engaging piece 404 is provided at the corresponding connecting tool 402. A plurality of engaging concave portions 406 are formed at the connecting tool 400 along the longitudinal direction thereof and disposed at predetermined intervals. As the engaging piece 404 engages the engaging concave portions 406, the movement in which the superposing unit 42 and the application unit move closer to or away from each other is controlled and the superposing unit 42 and the application unit 40 are connected. A coil spring 408 is interposed between the engaging piece 404 and the corresponding connecting tool 402. The coil spring 408 urges the engaging piece 404 in the engaging direction toward the engaging concave (recessed) portion 406. By removing the engaging piece 404 from the engaging concave portion 406 against the urging force of the coil spring 408, the engaging piece 404 can be engaged with another engaging concave portion 406. As a result, the interval between the superposing unit 42 and the application unit 40 can be changed. FIG. 13 shows a state in which the interval between the superposing unit 42 and the application unit 40 is set small, and FIG. 14 shows a state in which the interval between the superposing unit 42 and the application unit 40 is set large.

In this case as well, the time from which the application unit 40 effects application to the squeeze roller 300 effects squeeze is adjusted so as to be able to correspond flexibly to the photosensitive material 22 having different swelling time.

In the above-described embodiment, in addition to application and superposition, exposure and heat transfer development are effected on the common stage 12 so as to allow for the more compact device. Moreover, both heating of the water 58 applied to the photosensitive material 22 and heating required for heat development transfer are obtained by heating the stage 12. Thus, electricity is saved and a even more compact device is obtained.

Further, for example, after the exposure unit 38 completes exposure of one image, the integrated unit 100 may start to move. Also, as soon as the exposure unit 38 starts to move, the integrated unit 100 can start to move such that the exposure unit 38 effects exposure, and at the rear side thereof, the integrated unit 100 effects application and superposition. The time at which the integrated unit 100 starts to move is set to an appropriate time provided that the integrated unit 100 moves after the start of movement of the exposure unit 38.

Further, in the above-described embodiment, light is linearly illuminated onto the document 34 so as to scan-expose the photosensitive material 22. However, the present invention is not limited to this, and the light may be illuminated onto the whole surface of the document 34 so as to planarly-expose the photosensitive material 22. Moreover, in the first embodiment, the light which has been exposed onto the photosensitive material 22 is a reflected light which has been reflected by the document. However, the present invention is not limited to this, and the light may be a transmitted light which has been transmitted through the document. Namely, the document may be a reflecting document or a transmitting document. Thus, in a case in which the document is a reflecting document or a transmitting document, a so-called analog exposure is effected. However, the present invention is not limited to this, and a digital exposure in which a light beam is scan-exposed onto the photosensitive material on the basis of an image signal may be effected.

Still further, in the above embodiment, the photosensitive material 22 is taken up in a roll-form, and predetermined lengths thereof are pulled out and supplied onto the stage 12. However, the present invention is not limited to this, and a cut sheet which is cut to predetermined lengths may be used. The image recording paper is not limited to the cut sheet described in the above embodiment. The image recording paper may be taken up in a roll-form, and a predetermined length thereof is pulled out so as to be cut.

Peeling of the photosensitive material 22 and the image receiving material 78 may be carried out by using a pawl. The image forming solvent is not limited to the water 58, and the other transfer assistant may be used. The application portion for applying the image forming solvent is not limited to the sponge 54, and a felt or the like may be used. Any material may be used provided that it can absorb and hold water within the tank 52 and allows the water to flow out by contacting the photosensitive material 22. Application is not limited to use of the application unit 40 equipped with the sponge 58, and a roller or brush may be used.

Next, a second embodiment of the present invention will be explained with reference to FIGS. 15 through 18. In the second embodiment, a superposing unit is different from the one described in the first embodiment. In the description of the second embodiment, structures, members, parts and the like which are similar to those of the aforementioned first embodiment are designated by the same reference numerals used in the description of the first embodiment, and detailed descriptions thereof are omitted.

Figure 15:
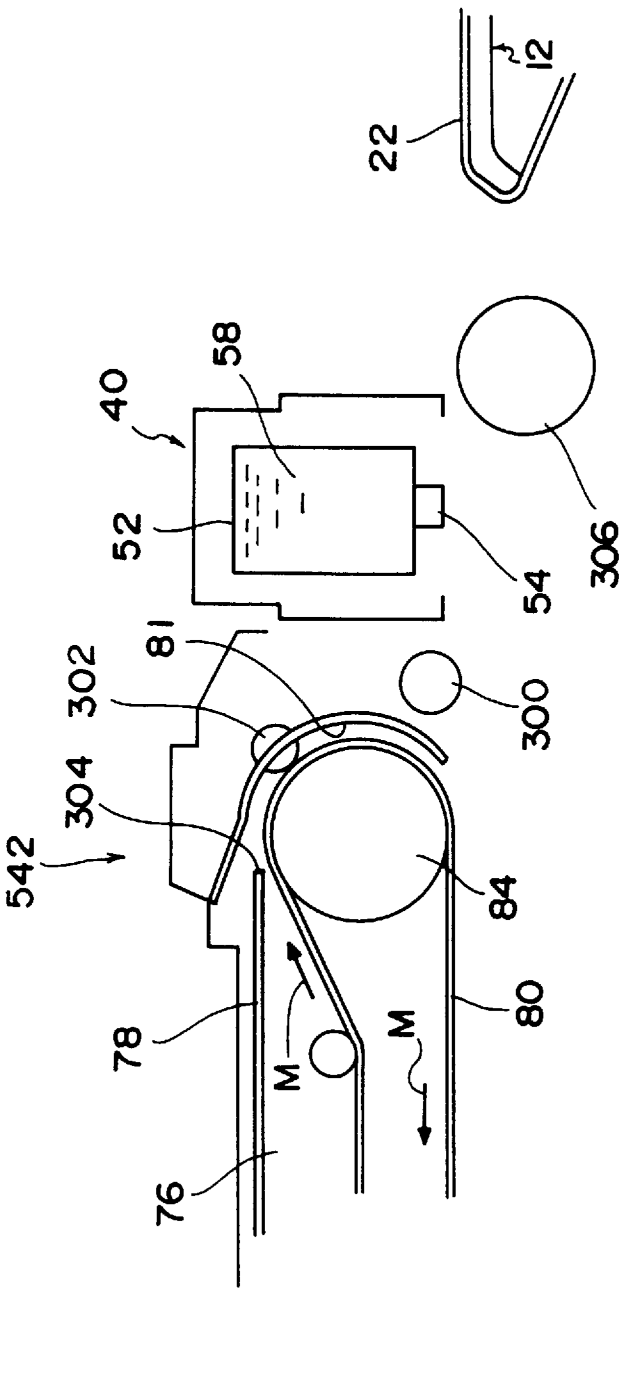
FIG. 15 is a view illustrating a superposing unit in an image recording device of a second embodiment, as seen along a moving direction thereof.

As illustrated in FIG. 15, an idler (idle roller) 302 is provided in the middle of a guide portion 81 so as to oppose the outer periphery of a roller 84 of the rollers 82, 84 (see FIG. 1) around which an endless belt 80 is trained. The roller 84 is disposed at the front side of a superposing unit 542 in the moving direction thereof and serves as a pasting roller.

In addition, the superposing unit 542 includes a squeeze roller 300 in the same way as in the first embodiment. As the superposing unit 542 moves, the squeeze roller 300 rotates on a photosensitive material 22 and exclusively squeezes the photosensitive material 22 to which water has been applied and on which an image receiving material 78 has not yet been superposed.

As the superposing unit 542 advances from a standby position shown in FIG. 15, the endless belt 80 travels (in FIGS. 15 through 18, the traveling direction of the endless belt 90 is a counterclockwise direction and denoted by the direction of arrow M). In the superposing unit 542, in a state in which the image receiving material 78 is pulled out from a magazine 76 and a pulled-out end 304 is nipped between the idler 302 and the pasting roller 84 (see FIG. 16), the endless belt 80 is stopped and the pulling-out of the image receiving material 78 from the magazine 76 is temporarily interrupted.

Figure 16:
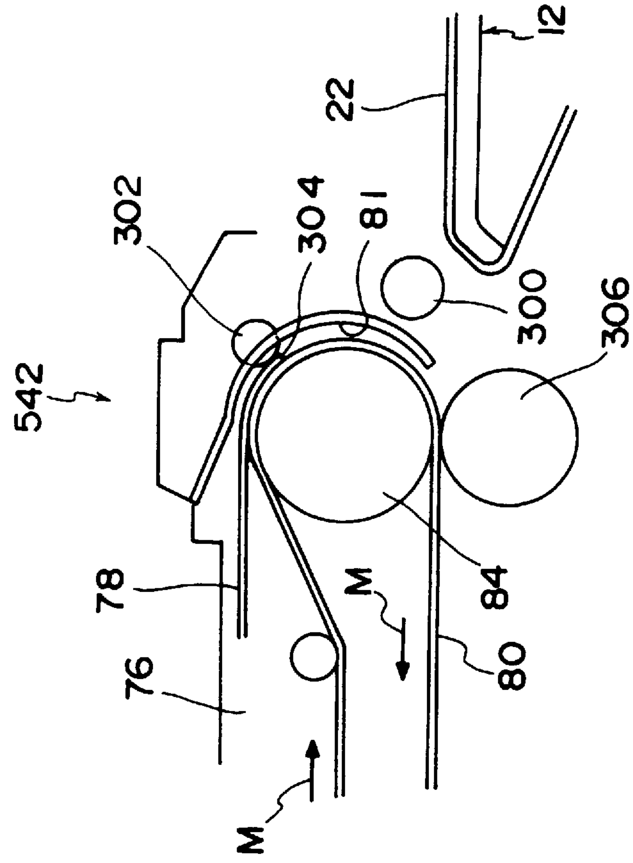
FIG. 16 is a view illustrating an operation process of the superposing unit in the second embodiment.
Figure 17:
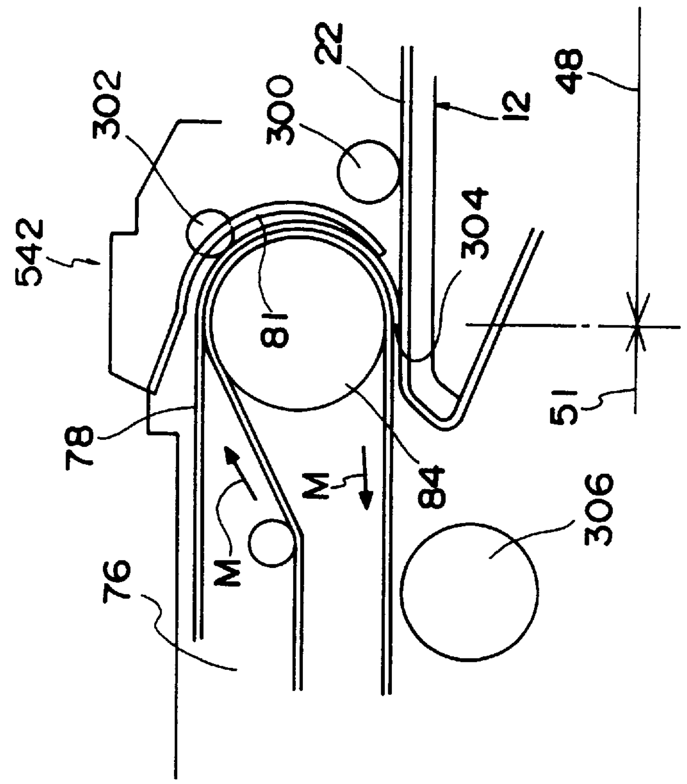
FIG. 17 is a view illustrating a subsequent operation process of the superposing unit in the second embodiment.
Figure 18:
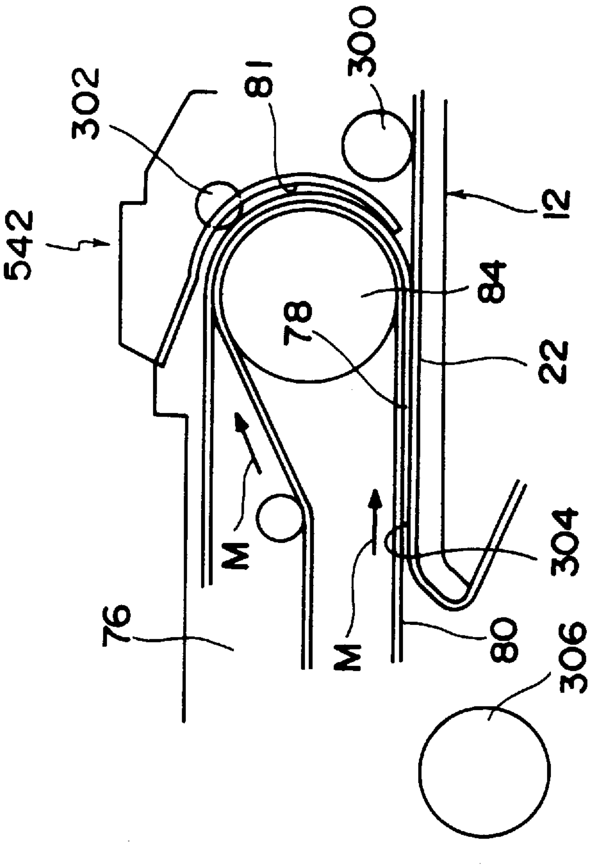
FIG. 18 is a view illustrating a further subsequent operation process of the superposing unit in the second embodiment.

The superposing unit 542 continues to advance, and as illustrated in FIG. 16, when the pasting roller 84 reaches a position at which the pasting roller 84 contacts a stopper roller (which is provided at a region off of the rear end of the stage 12) 306 via the endless belt 80, traveling of the endless belt 80 is started again. As a result, pulling-out of the image receiving material 78 from the magazine 76 is started again, and a portion of the image receiving material 78 which corresponds to the pasting roller 84 is inverted from the pulled-out end 304 side. As shown in FIG. 17, the pulled-out end 304 contacts the photosensitive material 22 at a front end (the end of the front area 51 (see FIG. 3) side) of the image area 48 (see FIG. 3). Thereafter, as illustrated in FIG. 18, the image receiving material 78 is superposed on the photosensitive material 22 between the endless belt 80 and the stage 12. Then, an end of the image receiving material 78 which is on the opposite side of the pulled-out end 304 reaches a rear end (the end of the rear area 50 (see FIG. 3) side) of the image area 48 such that the image receiving material 78 is superposed on the photosensitive material 22 over the entire image area.

Traveling of the endless belt 80 is effected by taking into consideration the movement and timing of the superposing unit 542 such that the pulled-out end 304 of the image receiving material 78 contacts the photosensitive material 22 at the front end of the image area 48.

In accordance with the second embodiment, as the superposing unit 542 moves, the image receiving material 78 is sent in the same direction as the moving direction of the superposing unit 542 and is superposed on the photosensitive material 22 with the image receiving material 78 being inverted from the front end thereof.

Conventionally, the photosensitive material is conveyed, and due to the conveyance, the photosensitive material is turned upside down so that the image receiving material is superposed on the photosensitive material.

In the second embodiment, since the image receiving material 78 is superposed on the photosensitive material 22 with the image receiving material 78 being inverted from the front end thereof, little space is required for conveying the image receiving material 78 which is superposed on the photosensitive material 22. This will contribute to compactness of the image recording device of the present invention itself. Further, because a contact angle between the photosensitive material 22 and the image receiving material 78 is made larger, the image receiving material 78 is superposed on the photosensitive material 22 without containing air therebetween, and streaks on the image receiving material 78 are prevented from occurring due to small or fine air bubbles. In particular, it is effective in a case in which exposure, application and superposing are carried out on the common stage.

Further, in the second embodiment, when the image receiving material 78 is inverted and superposed on the photosensitive material 22, the endless belt 80 is extended over the rollers 82, 84, and as the image receiving material 78 is sent by the endless belt 80, the portion of the image receiving material 78 which corresponds to the pasting roller 84 is inverted such that the image receiving material 78 is superposed on the photosensitive material 22 between the endless belt 80 and the stage 12. Since the endless belt 80 is used in this way, the number of rollers to be used is decreased.

Moreover, because the pasting roller 84 and the squeeze roller 300 can be closely positioned in accordance with a structure in which the superposing unit 542 includes the squeeze roller 300 towards the front of the superposing unit 542 in the moving direction thereof, the time from which the photosensitive material 22 is squeezed to which the image receiving material 78 is superposed on the photosensitive material 22 can be reduced, and the amount of evaporation of the water 58 which has been applied to the photosensitive material 22 can be reduced.

It should be avoided to increase excessively a diameter of the pasting roller 84 in order to enlarge the contact angle between the image receiving material 78 and the photosensitive material 22. On the other hand, it should be avoided to decrease excessively the diameter of the pasting roller 84 in order to properly bend the image receiving material 78 and obtain a uniform pasting force. The diameter of the pasting roller 84 should be set to an appropriate diameter.

As the photosensitive material used in the image recording device of the present invention, a so-called heat development photosensitive material (the photosensitive material 22 in the present embodiment) can be mentioned, in which a latent image obtained by image-wise exposure is heat-development-transferred onto an image receiving material under the presence of an image forming solvent so as to obtain a visible image.

The heat development photosensitive material basically includes, on a substrate, a photosensitive silver halide, a reducing agent, a binder and a dye providing compound. (There is also a case in which the reducing agent serves as the dye providing compound.) Moreover, as occasion demands, the photosensitive material can include an organometallic base oxidizing agent or the like.

The heat development photosensitive material may provide a negative image or a positive image to exposure. A method of using a direct positive emulsion as the silver halide emulsion (there are two types of method: a method of using nucleus forming agent and a light fogging method), or a method of using a dye providing compound which discharges a positively-diffused dye image can be employed as a method of providing a positive image.

The material disclosed in, for example, JP-A No. 6-161070 and JP-A No. 6-289555 can be used as the heat development photosensitive material of the method of providing a positive image. The material disclosed in, for example, JP-A No. 5-181246 and JP-A No. 6-242546 can be used as the heat development photosensitive material in the method of providing a negative image.

Further, water, for example, is used as an image forming solvent in the present invention. The water is not limited to so-called demineralized water, and includes water in a wide and general sense. The solvent may be a mixed solvent of demineralized water and a low boiling point solvent such as methanol, DMF, acetone, di-isobutyl ketone or the like. In addition, the solutions include image forming accelerators, antifoggants, developing terminators, hydraulic heat solvents or the like.

What is claimed is:

1. An image recording device in which an image is exposed onto a photosensitive material, and an image forming solvent is applied to the photosensitive material, and an image receiving material is superposed on the photosensitive material, and then heat development transfer is carried out so as to obtain an image on the image receiving material, comprising:

a fixed stage which holds said photosensitive material;

an application unit which applies said image forming solvent to said photosensitive material held on said stage;

a superposing unit which superposes said image receiving material on said photosensitive material held on said stage;

connecting means which connects said application unit and said superposing unit such that said application unit and said superposing unit are moved integrally in a relationship in which one of said application unit and said superposing unit is positioned in front of the other of said application unit and said superposing unit; and a squeeze roller which is disposed between said application unit and said superposing unit, said squeeze roller being moved in accordance with the integral movement of said application unit and said superposing unit, wherein as said application unit and said superposing unit are moved such that said application unit is positioned in front of said superposing unit, said image forming solvent is applied to said photosensitive material by said application unit, said photosensitive material, to which said image forming solvent is applied, is squeezed by said squeeze roller, and said image receiving material is superposed by said superposing unit on said photosensitive material which has been squeezed.

2. An image recording device according to claim 1, wherein said connecting means is structured such that a connection between said superposing unit and said application unit can be released.

3. An image recording device according to claim 2, wherein said connecting means includes changing means which changes a distance between said application unit and said superposing unit.

4. An image recording device according to claim 3, wherein said connecting means includes a female screw portion, which is provided at one of said application unit and said superposing unit, and a male screw portion, which is provided at the other of said application unit and said superposing unit and which is screwed to said female screw portion.

5. An image recording device according to claim 4, wherein said changing means includes rotating means which rotates one of said female screw portion and said male screw portion such that said application unit and said superposing unit move closer to or away from each other.

6. An image recording device according to claim 5, wherein said rotating means is a motor.

7. An image recording device according to claim 2, wherein said connecting means includes:

an elongated member which is provided at one of said application unit and said superposing unit, which extends toward the other of said application unit and said superposing unit, and which has a plurality of engaging concave portions disposed at predetermined intervals along a longitudinal direction of said elongated member; and an engaging piece which is provided at said other of said application unit and said superposing unit and which engages any one of said plurality of engaging concave portions so as to connect said application unit and said superposing unit.

8. An image recording device according to claim 7, wherein said connecting means further includes:

supporting means which is provided at said other of said application unit and said superposing unit and supports said engaging piece; and urging means which, in a state in which said engaging piece engages any one of said plurality of engaging concave portions, urges said engaging piece in a direction of the engaging concave portion with which said engaging piece engages.

9. An image recording device according to claim 2, wherein said superposing unit includes supporting means which supports said squeeze roller so that said squeeze roller is rotatable.

10. An image recording device according to claim 2, wherein said stage includes heating means which heats said stage itself.

11. An image recording device according to claim 10, wherein said stage is formed by a plate-shaped member, said heating means is built in said stage.

12. An image recording device in which an image is exposed onto a photosensitive material, and an image forming solvent is applied to the photosensitive material, and an image receiving material is superposed on the photosensitive material, and then heat development transfer is carried out so as to obtain an image on the image receiving material, comprising:

a fixed stage which holds said photosensitive material;

exposure means which exposes said photosensitive material held on said stage;

an application unit which applies said image forming solvent to said photosensitive material held on said stage;

a squeeze roller which squeezes said photosensitive material, which has been held on said stage and to which said image forming solvent has been applied by said application unit;

a superposing unit which superposes said image receiving material on said photosensitive material, which has been held on said stage and which has been squeezed by said squeeze roller;

connecting means which connects said application unit and said superposing unit such that said application unit and said superposing unit are moved integrally in a relationship in which one of said application unit and said superposing unit is positioned in front of the other of said application unit and said superposing unit; and supporting means which is provided at said superposing unit, said supporting means supporting said squeeze roller such that said squeeze roller is positioned between said application unit and said superposing unit, wherein after said photosensitive material has been exposed by said exposure means, as said superposing unit and said application unit are moved on said stage in a state in which said application unit is positioned in front of said superposing unit, said image forming solvent is applied to said photosensitive material by said application unit, said photosensitive material, to which said image forming solvent is applied, is squeezed by said squeeze roller, and said image receiving material is superposed by said superposing unit on said photosensitive material which has been squeezed.

13. An image recording device according to claim 12, wherein said connecting means is structured such that a connection between said superposing unit and said application unit can be released.

14. An image recording device according to claim 13, wherein said connecting means includes changing means which changes a distance between said application unit and said superposing unit.

15. An image recording device according to claim 14, wherein said connecting means includes a female screw portion, which is provided at said superposing unit, and a male screw portion, which is provided at said application unit and which is screwed to said female screw portion.

16. An image recording device according to claim 15, wherein said changing means includes rotating means which rotates said male screw portion such that said application unit and said superposing unit move closer to or away from each other.

17. An image recording device according to claim 16, wherein said rotating means is a motor.

18. An image recording device according to claim 13, wherein said connecting means includes:

an elongated member which is provided at said application unit, which extends toward said superposing unit, and which has a plurality of engaging concave portions disposed at predetermined intervals along a longitudinal direction of said elongated member; and an engaging piece which is provided at said superposing unit and which engages any one of said plurality of engaging concave portions so as to connect said application unit and said superposing unit.

19. An image recording device according to claim 18, wherein said connecting means further includes:

supporting means which is provided at said superposing unit and supports said engaging piece; and urging means which, in a state in which said engaging piece engages any one of said plurality of engaging concave portions, urges said engaging piece in a direction of an engaging concave portion with which said engaging piece engages.

20. An image recording device according to claim 13, wherein said stage includes heating means which heats said photosensitive material held on said stage.

21. An image recording device in which an image is exposed onto a photosensitive material, and an image forming solvent is applied to the photosensitive material, and an image receiving material is superposed on the photosensitive material, and then heat development transfer is carried out so as to obtain an image on the image receiving material, comprising:

a fixed stage which holds said photosensitive material; and a superposing unit which superposes said image receiving material on said photosensitive material held on said stage, wherein said superposing unit is moved in a direction along said photosensitive material, in accordance with this movement, said image receiving material is sent in said direction, and said image receiving material is superposed on said photosensitive material from the front end of said image receiving material with said image receiving material being inverted.

* * * * *